C. B. JOHNSON.
MACHINE FOR CUTTING SHEET MATERIAL.
APPLICATION FILED JUNE 30, 1919.
1,355,796.
Patented Oct. 12, 1920.
5 SHEETS—SHEET 2.
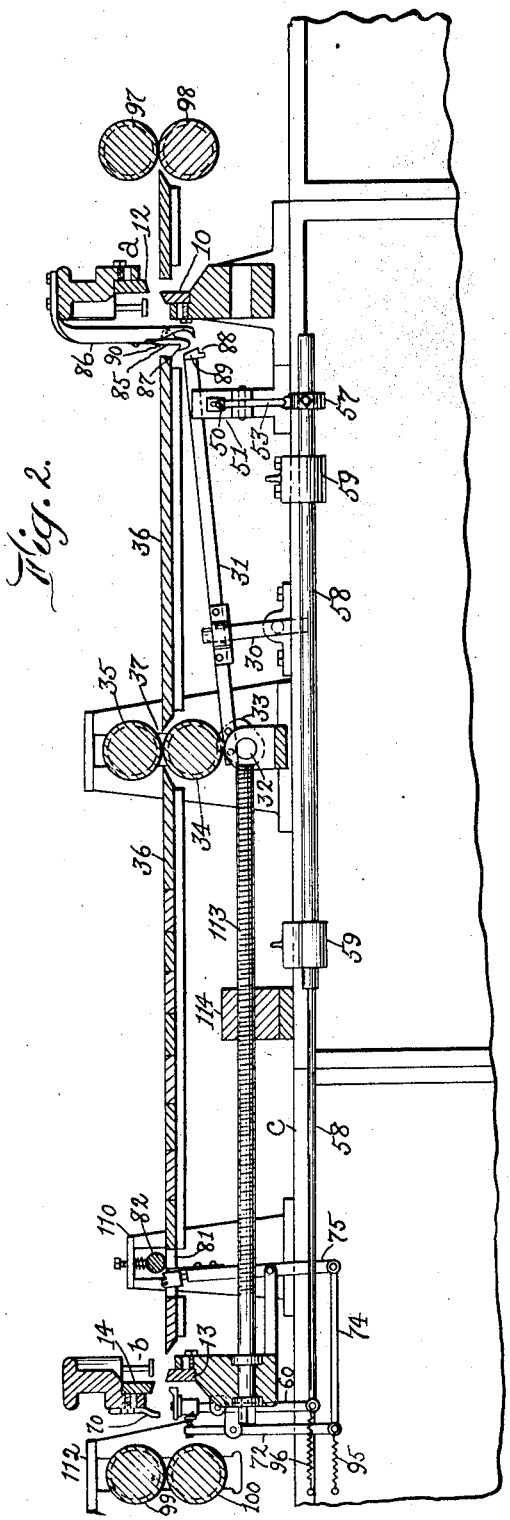
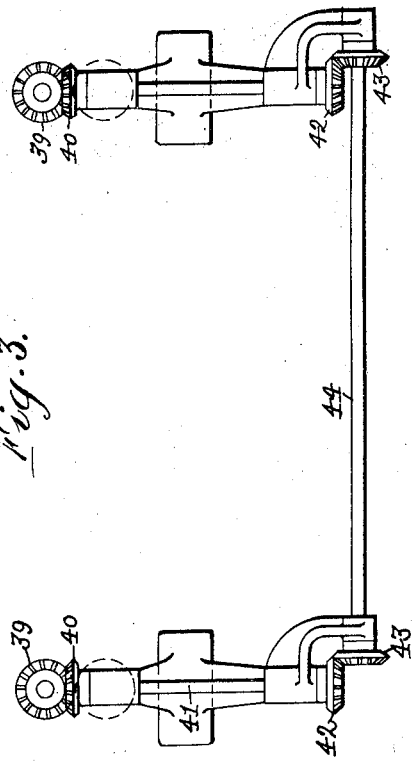
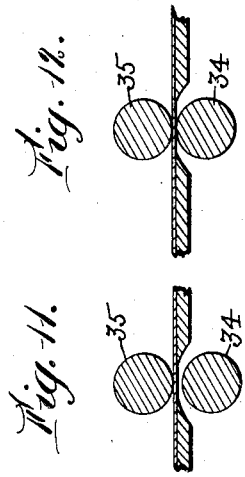
Inventor
Carl B. Johnson
By Jas. H. Churchill
Atty.

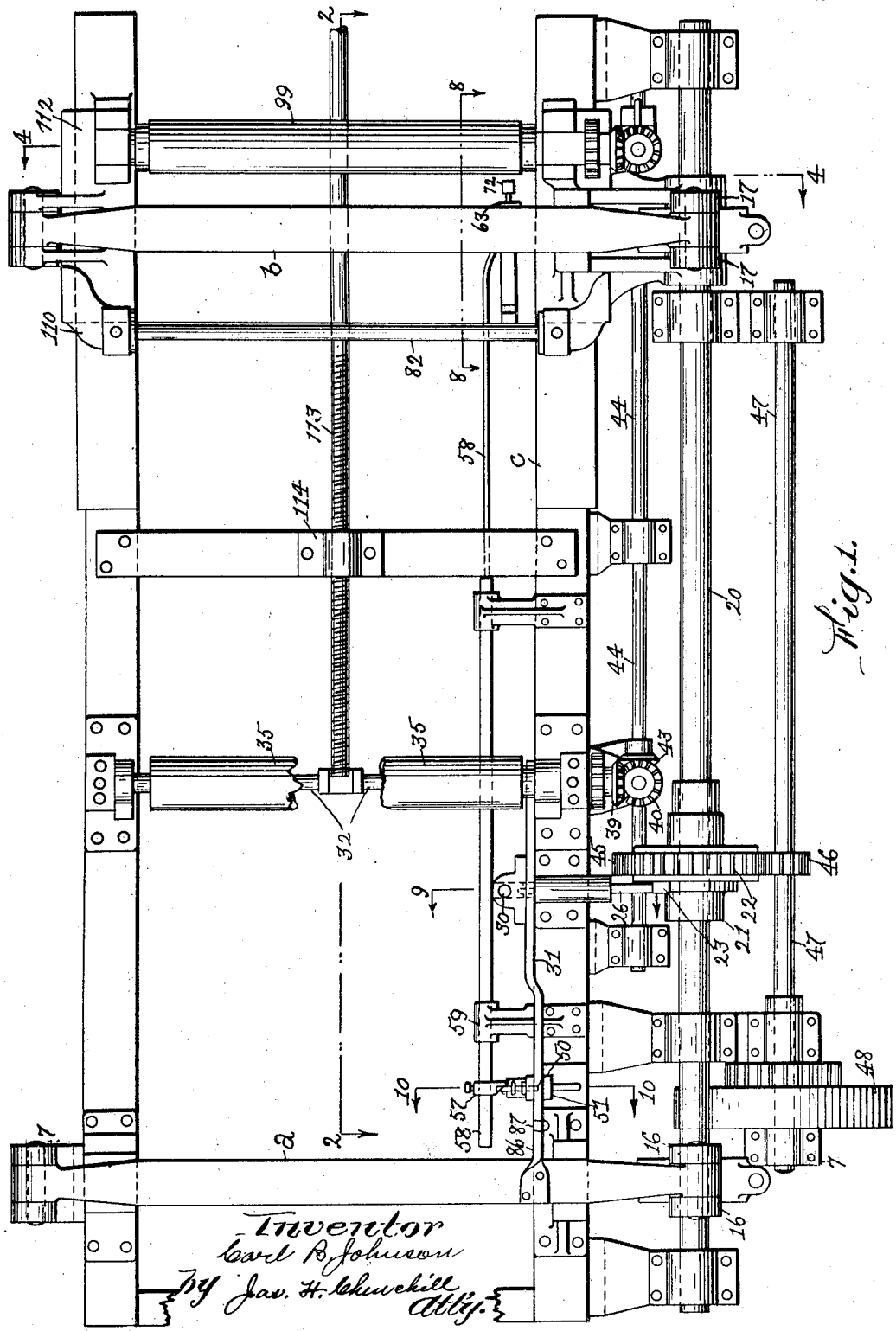

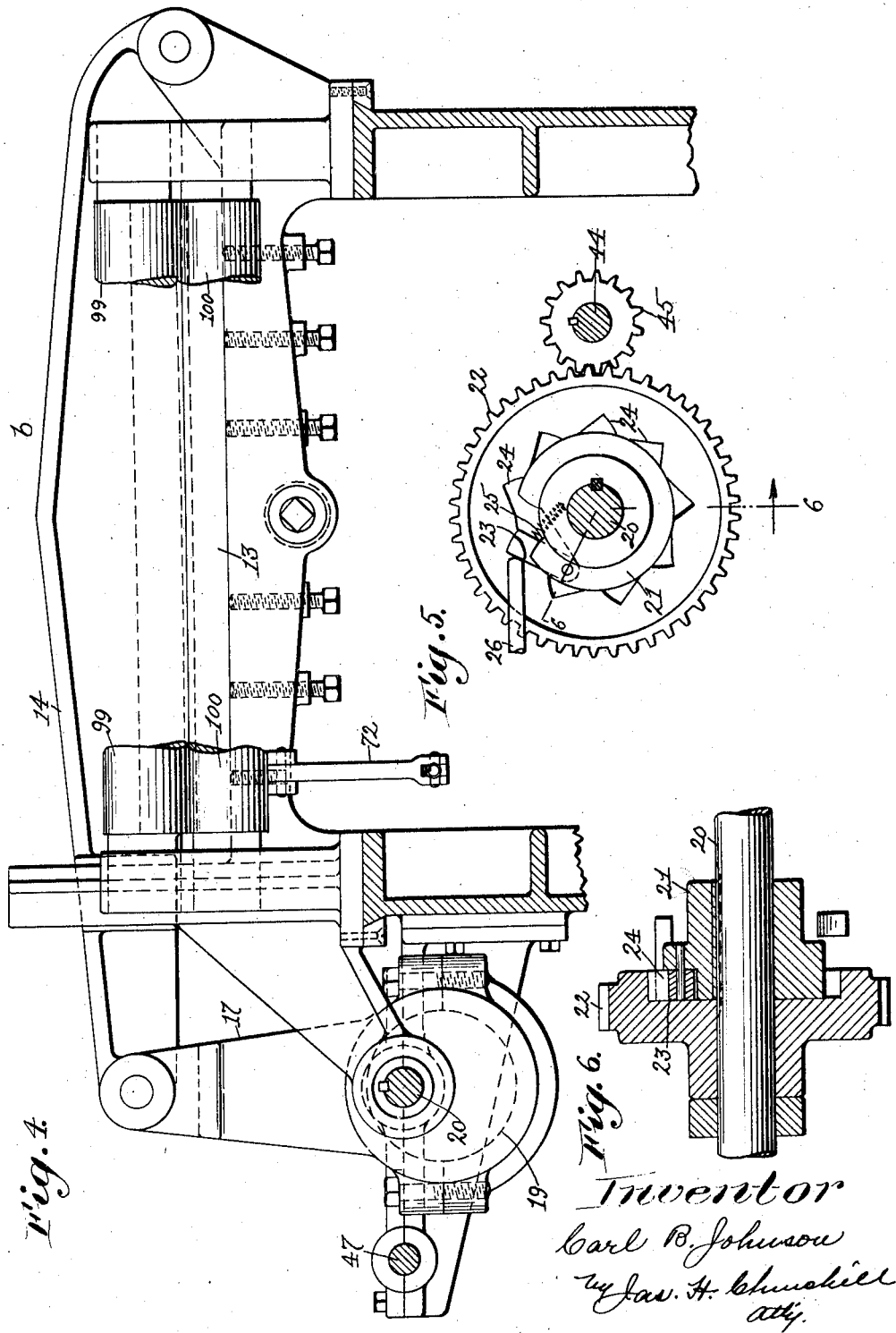

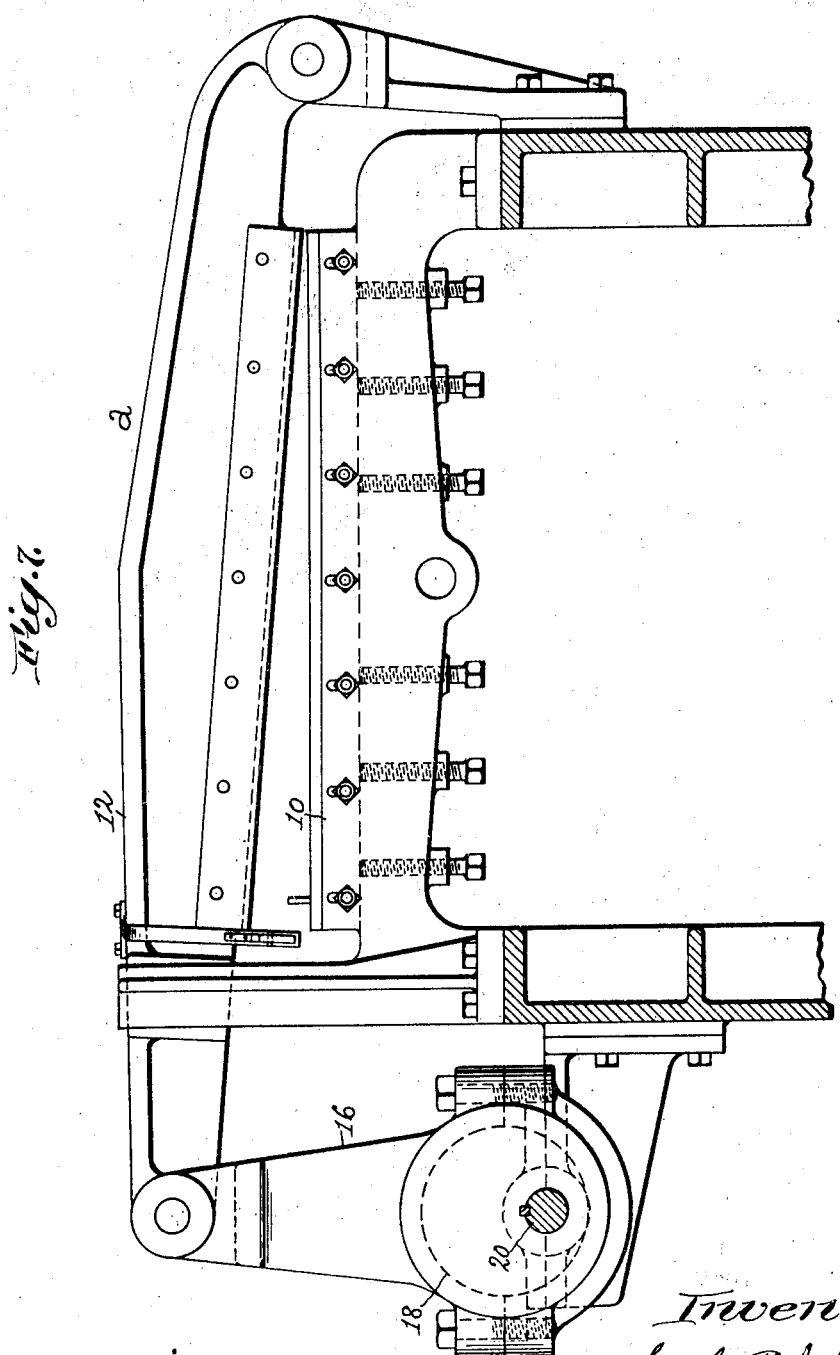

C. B. JOHNSON.
MACHINE FOR CUTTING SHEET MATERIAL.
APPLICATION FILED JUNE 30, 1919.
1,355,796.
Patented Oct. 12, 1920.
5 SHEETS—SHEET 5.
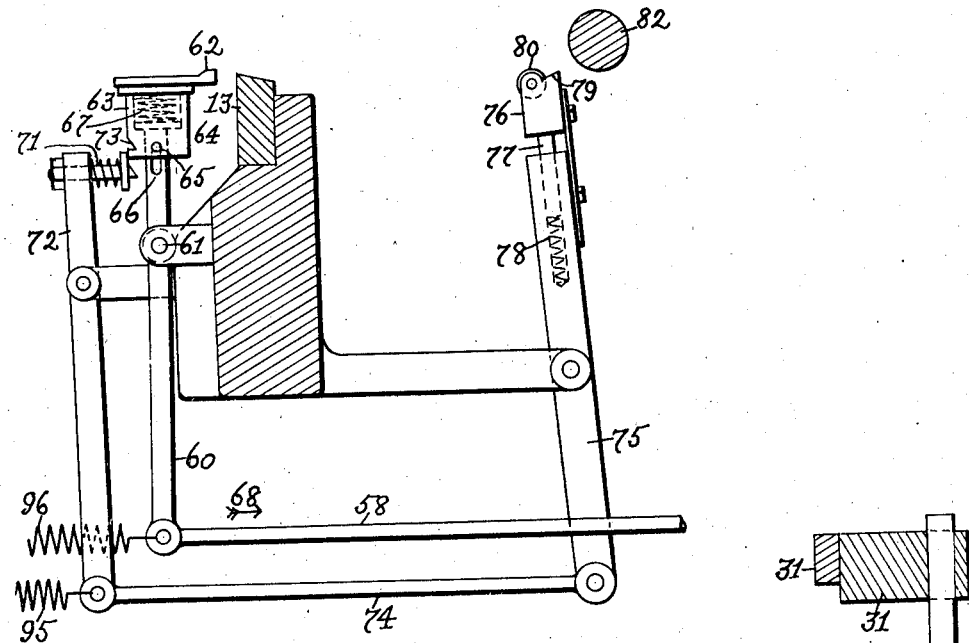
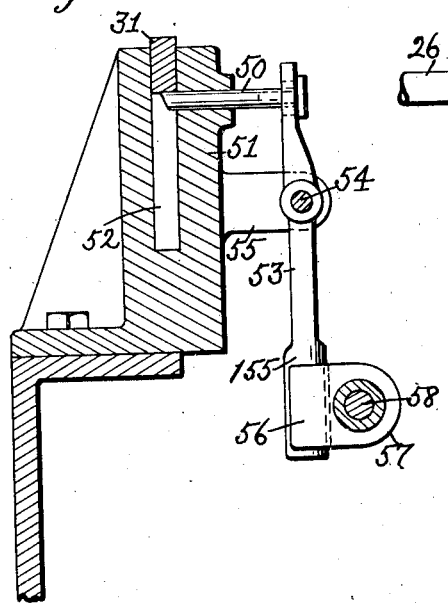
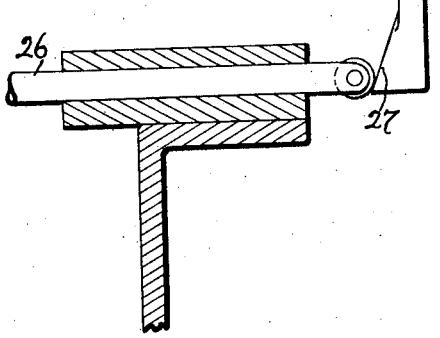
Inventor:
Carl B. Johnson
by Jas. H. Churchill
Atty.

UNITED STATES PATENT OFFICE.

CARL B. JOHNSON, OF WINCHESTER, MASSACHUSETTS, ASSIGNOR TO LAMB & NASH COMPANY, OF WINCHESTER, MASSACHUSETTS, A CORPORATION OF MAINE.

MACHINE FOR CUTTING SHEET MATERIAL.

1,355,796.

Specification of Letters Patent.  Patented Oct. 12, 1920.

Application filed June 30, 1919. Serial No. 307,530.

*To all whom it may concern:*

Be it known that I, CARL B. JOHNSON, a citizen of the United States, residing in Winchester, in the county of Middlesex and State of Massachusetts, have invented an Improvement in Machines for Cutting Sheet Material, of which the following description, in connection with the accompanying drawings, is a specification, like characters on the drawings representing like parts.

This invention relates to a machine especially adapted for cutting sheet material and particularly metal sheets.

The invention has for its object to provide a machine with which metal sheets may be cut in a minimum time and with a minimum of power, as will be described.

To this end, the machine is provided with means for feeding the metal sheet into position to be cut by a plurality of cutters spaced apart and arranged transversely with relation to the path of movement of the sheet; and is further provided with means for intermittently and alternately operating the said feeding means and the cutters, whereby the metal sheet is fed to the cutters, is stationary while being cut, and is then fed forward after being cut.

These and other features of the invention will be pointed out in the claims at the end of this specification.

Figure 1 is a plan view of a machine embodying this invention.

Fig. 2, a longitudinal section of the machine shown in Fig. 1, with parts omitted, the section being taken on line 2—2, looking in the direction of the arrow thereon.

Fig. 3, a detail of the driving mechanism for the feed rolls.

Fig. 4, a cross section on the line 4—4, Fig. 1, showing one pair of cutters in their operative or closed position.

Fig. 5, a detail of one form of clutch controlling the action of the cutters.

Fig. 6, a section on line 6, Fig. 5.

Fig. 7, a cross section on line 7—7, Fig. 1, showing one pair of cutters in their open position.

Fig. 8, an enlarged detail in section to illustrate one form of stop mechanism for positioning the metal sheet with relation to the cutters, the section being taken on line 8—8, Fig. 1.

Fig. 9, an enlarged detail in section showing the cam which controls the clutch, the section being taken on line 9, Fig. 1.

Fig. 10, an enlarged detail in section of the mechanism controlling the feed rolls, the section being taken on line 10—10 Fig. 1, and Figs. 11 and 12, details to be referred to.

In the present instance, the invention is shown as embodied in a machine for providing metal sheets of relatively large size with parallel end edges. Referring to the drawings and particularly Figs. 1 and 2, $a$, $b$, represent two pairs of cutters or knives, which are mounted upon a suitable frame work $c$ and are spaced apart a distance equal to the length it is desired to impart to the sheet when cut. The pairs of cutters $a$, $b$, may be of any suitable construction, and each pair is shown as composed of a stationary lower knife and a movable upper knife. The pair $a$, which may be termed the front cutters, comprises the stationary knife 10 and the movable knife 12, and the pair $b$, which may be termed the rear cutters, comprises the stationary lower knife 13 and the movable knife 14.

The movable knives 12, 14, are shown as pivoted at their rear ends and have their front ends connected with eccentric rods 16, 17, actuated by eccentrics 18, 19 on a shaft 20 extended longitudinally of the machine and suitably supported by the frame work $c$.

The eccentric shaft 20 is designed to be rotated intermittently, which may be accomplished in any suitable manner and in the present instance I have shown a known form of clutch mechanism for this purpose. The clutch mechanism herein shown, see Figs. 5 and 6, comprises a member 21 fast on the shaft 20, a gear member 22 mounted to turn on the member 21, and a dog or coupling member 23 pivoted to the member 21 and adapted to be engaged with one of a plurality of teeth or notches 24 on the inner circumference of the gear 22 so as to render the said gear fast on the shaft 20. The dog 23 is engaged with a tooth 24 by a spring 25 and is disengaged therefrom by a rod 26, which is actuated by a cam 27, see Figs. 2 and 9, on a rod 30 depending from a lever 31, which will be hereinafter designated the clutch controlling lever, and which has one end fast on a rock shaft 32, provided with cams 33, located near the opposite ends of said rock shaft and arranged to engage the lower roll 34 of a pair of feed rolls, the upper feed roll 35 being located above a table 36 upon which the metal sheet rests as it is fed through the machine. The feed rolls 34, 35 are respectively located below and above a transverse opening or slot 37 in the table 36, and between the cutters a, b. The lower feed roll 34 is raised into its operative position shown in Fig. 12 by the cams 33, and is lowered by gravity into its inoperative position shown in Fig. 11 when the rock shaft 32 is permitted to be turned so as to lower the cams 33 as will be described. The lower feed roll 34 is frictionally driven by the metal sheet interposed between it and the upper roll 35, which is positively driven. In the present instance the upper feed roll 35 is provided with a bevel pinion 39, see Figs. 2 and 3, which meshes with a bevel pinion 40 on an upright shaft 41, having near its lower end a bevel pinion 42, which meshes with a bevel pinion 43 on a shaft 44, provided with a pinion 45 which is driven by the clutch gear 22, see Figs. 1 and 5, which in turn is driven by a pinion 46 on a main shaft 47 provided with a driving pulley 48. It will thus be seen that the upper feed roll 35 is constantly driven, and that the lower feed roll is intermittently driven, being idle when lowered and in motion when raised by the cams 33. It will also be observed that the eccentric shaft 20 is intermittently rotated, being idle when the feed rolls 34, 35 are feeding the metal sheet, and active to operate the movable knives 12, 14 when the feed roll 34 is in its lowered position and the metal sheet is stationary on the table 36.

The alternate action of the feed rolls 34, 35 to feed the metal sheet and of the cutters a, b, to simultaneously cut the metal sheet at its opposite ends, is placed under the control of mechanism as will now be described.

As above pointed out, the movable knives 12, 14 are lowered and raised by the eccentrics 18, 19 on the shaft 20, and rotation of this shaft is controlled by the clutch whose coupling member 23 is controlled by the rod 26 and cam 27 on rod 30 attached to the lever 31. When the lever 31 is in its elevated position shown in Fig. 2, the cam 27 acts on the rod 26, as shown in Fig. 9, to disengage the coupling member or dog 23 from the gear member 22 of the clutch, and the eccentric shaft 20 is at such time stationary, and the movable knives 12, 14 are in their raised or open position. At such time, the lower feed roll 34 is in its raised or operative position shown in Fig. 2, and is held in this position by a device which coöperates with the lever 31.

This device is shown as a pin 50, see Figs. 2 and 10, which slides in an upright 51 having a slot 52 in which the lever 31 moves up and down. The free end of the pin 50 is extended under the lever 31 and holds the latter in its elevated position until the pin 50 is withdrawn from the slot 52 so as to allow the lever 31 to drop. The holding pin 50 is attached to the upper end of a lever 53 pivoted at 54 to an arm 55 on the upright 51 so as to rock toward and away from the upright. The lower end of the lever 53 is provided with an inclined or beveled portion 155 with which coöperates a cam or inclined portion 56 on a collar 57 secured to a rod 58, which slides in suitable bearings 59, see Fig. 2, and has its front end pivotally connected to the lower end of a lever 60, see Figs. 2 and 8, which is pivoted at 61 to the framework c at the rear end of the machine. The lever 60 may be designated the stop lever as it carries at its upper end a device, which is designed to be projected into the path of movement of the metal sheet and be engaged by the latter and arrest movement of the sheet when the latter has been properly positioned with relation to the cutters. In the present instance the stop device is shown as a projection 62 on the head of a cylinder 63 slidable on a piston 64 on the upper end of the lever 60, said cylinder being attached to the lever 60 by a pin 65 carried by the cylinder and extended through a slot 66 in the lever 60. The cylinder 63 is moved upwardly so as to project the stop 62 into the path of movement of the metal sheet, by a spring 67 located in the cylinder. As shown in Fig. 2, the stop device is located below the path of movement of the metal sheet, and in Fig. 8 is elevated by the spring 67 into the path of movement of the metal sheet, so that, when the end of the metal sheet strikes the stop 62 the upper end of the lever 60 is moved away from the knife 13 and the lower end of said lever is moved in the opposite direction as indicated by the arrow 68, carrying with it the rod 58, and causing the cam 56 to engage the cam 155 and rock the lever 53 so as to withdraw the holding pin 50 from engagement with the lever 31, and thus permit the latter to descend and rock the shaft 32 and its cams 33 and allow the lower feed roll 34 to drop away from the metal sheet, which is thus held stationary on the table by the stop, and is properly positioned with relation to the cutters a, b to have the opposite ends cut or trimmed by the knives 12, 14, which are brought into action by the cam 27 carried by the lever 31 being lowered away from the rod 26 so as to permit the spring 25 of the clutch to couple the gear member 22 to the eccentric shaft 20. The eccentric shaft 20 is allowed to make one revolution so as to cause the opposite ends of the metal sheet to be cut or trimmed simultaneously by the cutters and so as to return the movable cutters to their raised or open position. Provision is made for lowering the stop 62 below the path of movement of the metal sheet so that the cut or trimmed metal sheet may be fed out of the machine. This result is effected in the present instance by attaching to the movable knife 14 an arm 70, see Fig. 2, which is designed to engage the stop cylinder 63 and depress the same against the action of the spring 67 and thus lower the stop 62 below the lower knife 13 and therefore below the path of movement of the metal sheet, in which position it is held by a locking device shown as a spring pressed catch 71, see Fig. 8, carried by a lever 72 and adapted to engage a notch or recess 73 in the cylinder 63.

The lever 72 is pivoted to the framework and is connected by a link 74 to a lever 75, which may be designated the tripping lever, as its function is to trip the catch 71 and release the stop 62. The lever 75 is provided at its upper end with a movable member 76, having a stem or rod 77 extended into a socket in the lever 75 containing a spring 78 which projects the member 76 away from the lever 75, so that the upper end of the member 76 projects slightly above the table 36 as shown in Fig. 2, and into position to be engaged by the metal sheet as the latter is fed forward by the feed rolls 34, 35. The member 76 is preferably provided with the beveled upper surface 79 so as to form a relatively sharp corner for the sheet to engage, and is further provided with a roller 80 to support the end of the metal sheet, while the latter is being fed out of the machine. The movable member 76 of the tripping device or lever 75 projects through a slot 81 in the table, and a spring pressed roller 82 is preferably located above the slot 81 and slightly in advance of the tripping lever, so as to insure engagement of the end of the uncut metal sheet with said tripping device. By reference to Fig. 2, it will be seen that as the metal sheet is fed under the presser roller 82 its front end engages the corner of the member 76 and forces the upper end of the tripping lever down into the slot 81 and below the path of movement of the metal sheet. This movement of the lever 75 is transmitted to the latch carrying lever 72 and the latter is turned so as to disengage the latch 71 from the cylinder 63 and thereby allow the spring 67 to elevate the cylinder 63 and bring the stop 62 into position to arrest the feed of the uncut metal sheet and properly position it with relation to the cutters. Provision is also made for bringing the feed rolls 34, 35 into action after the metal sheet has been cut or trimmed by the cutters. This is accomplished as herein shown by a device which is movable with the knife 12 and coöperates with the lever 31. The device referred to consists as herein shown, see Fig. 2, of a lever 85 pivoted to an arm 86 fastened to the knife 12 and depending from the same so as to enable a bent finger or latch 87 on the lever 85 to engage a shoulder 88 on the under side of a block 89 attached to or forming part of the lever 31. The lever 85 is normally pressed by a spring 90 so that the latch 87 is in position to engage the block 89 when the lever 31 is in its lowered position, and the end of the block 89 is beveled as shown in Fig. 2, so that the lever 85 will be turned on its pivot against the action of the spring 90 when the knife 12 is operated to cut the sheet. The latch 87 is arranged so that it will pass below the block 89 in the lowered position of the lever 31, which permits the spring 90 to turn the lever back into its normal position with relation to the arm 86 and bring the latch 87 under the shoulder 88, so that when the knife 12 is elevated, the latch 87 will engage the shoulder 88 and carry the rear end of the lever 31 with it, until the lever 31 is prevented from further upward movement, whereupon the latch 87 is disengaged from the shoulder 88 by the further upward movement of the arm 86 and knife 12, and after the latch has thus cleared the lever 31, the spring 90 restores it to its normal position shown in Fig. 2.

The tripping lever 75 and latch lever 72 are restored to their normal positions by a spring 95, and the stop lever 60 and slide rod 58 are restored to their normal positions by a spring 96. The machine may and preferably will be provided at its front end with a pair of feed rolls 97, 98 and with a pair of feed rolls 99, 100 at its rear end, and both rolls of these pairs of feed rolls may be positively driven from the shaft 44 or they may be otherwise driven.

The operation of the machine may be briefly described as follows:—When the machine is idle the knives 12, 14 are stationary in their open position, the feed rolls 34, 35 are in their operative relation, the lower roll 34 being elevated by the cams 33 which are locked in their operative position by the locking pin 50; the clutch is out, being rendered so by the cam 27; the stop 62 is in its lowered position and the tripping lever 75 in its operative position.

The metal sheet is fed into the machine by the rolls 97, 98 and is picked up and fed forward by the feed rolls 34, 35, and on meeting the member 76 of the tripping device actuates the catch lever 72 and releases the stop 62, which is projected into position to be engaged by the uncut metal sheet and moved therewith a slight distance. This movement of the stop by the metal sheet disengages the holding pin 50 from the lever 31 and allows the latter to descend, thereby stopping the feed of the metal sheet with its opposite ends between the knives of the front and rear cutters a, b. The clutch is automatically thrown in as above described and the eccentric shaft 20 is coupled to the driving shaft 47, thereby operating the knives 12, 14 to simultaneously trim or cut the opposite ends of the metal sheet, and when said knives are arranged parallel and substantially at right angles to the path of movement of the sheet, the latter is provided with parallel end edges which are substantially at right angles to the side edges of said sheet.

When the metal sheet has been cut or trimmed off, the feed roll 34 is raised into its operative position and the knives rendered stationary in their open position. The feed rolls 34, 35 then feed the cut sheet out of the machine far enough to be picked up by the delivery rolls 99, 100 or by an operator if the delivery rolls are omitted. When the rear end of the sheet is cut by the knife 14, the stop is lowered and is locked in its lowered position by the latch 71, and the member 76 of the tripping device is projected up through the slot 81 in the table by the spring 78 and the front end of the sheet which is free is supported by the roller 80 while it is being fed out of the machine. It will thus be seen that the feed rolls 34, 35 and the knives operate alternately on the metal sheet. It will also be observed that the operation of the feed roll 34 is controlled by the sheet in coöperation with the stop, and that the operation of the cutters is controlled by the sheet in coöperation with the stop, and further that the operation of the stop is controlled by the sheet in coöperation with the tripping mechanism.

Provision is made for enabling metal sheets of different lengths within limits to be cut or trimmed, and to this end, the cutter b, and uprights 110, 112 which support the presser roll 82 and delivery rolls 99, 100 are slidably mounted on the frame c so as to be moved as one piece away from the intermediate feed rolls 34, 35, which is effected by a screw rod 113 rotatable in a cross bar 114 of the frame c. The portion of the table 36 between the cutter b and the feed rolls 34, 35 is made in sections as represented in Fig. 2, so that it can be lengthened or shortened to conform to the length of the sheets to be cut.

In practice the upper feed roll 35 is arranged above the table 36 a distance slightly greater than the thickness of the metal sheet, and the latter is raised by the lower feed roll 34 in contact with the upper feed roll, when it is desired to feed the metal sheet. This relation of parts is illustrated in Figs. 11 and 12.

I have herein shown one embodiment of the invention, but it is not desired to limit the invention to the particular construction shown.

Claims.

1. In a machine of the character described, in combination, a plurality of pairs of cutters spaced apart and arranged transversely with relation to the path of movement of the sheet to be cut and operating simultaneously to cut the sheet transversely at the opposite ends of the latter to trim off the end edges thereof, means located between said pairs of cutters for feeding the said sheet into operative relation to the cutters, and means for intermittently and alternately operating automatically said feeding means and said cutters.

2. In a machine of the character described, in combination, a plurality of pairs of cutters spaced apart and arranged transversely with relation to the path of movement of the sheet to be cut and operating simultaneously to cut the sheet transversely at the opposite ends of the latter to trim off the end edges thereof, means located between said pairs of cutters for feeding the said sheet into operative relation to the cutters, a stop to be engaged by said sheet and controlling said feeding means to automatically interrupt the feed of said sheet and render it stationary while it is being acted upon by said cutters, and means for operating said cutters alternately with said feeding means.

3. In a machine of the character described, in combination, a plurality of pairs of cutters spaced apart and arranged transversely with relation to the path of movement of the sheet to be cut and operating simultaneously to cut the sheet transversely at the opposite ends of the latter to trim off the edges thereof, means for feeding said sheet to said cutters, a stop to be engaged by said sheet and controlling said feeding means so as to render the sheet stationary while being cut and to feed the cut sheet out of the machine after it has been cut.

4. In a machine of the character described, in combination, a plurality of pairs of cutters spaced apart and arranged transversely with relation to the path of movement of the sheet to be cut, a pair of feed rolls located between said cutters, the lower of said feed rolls being bodily movable toward and from the upper feed roll, a rock shaft provided with cams coöperating with said lower feed roll, and means for operating said rock shaft.

5. In a machine of the character described, in combination, a plurality of pairs of cutters spaced apart and arranged transversely with relation to the path of movement of the sheet to be cut, a pair of feed rolls located between said cutters, the lower of said feed rolls being bodily movable toward and from the upper feed roll, a rock shaft provided with cams coöperating with said lower feed roll, a lever to rock said shaft, means for operating said cutters, a clutch to control said means, and a device movable with said lever to control said clutch.

6. In a machine of the character described, in combination, a plurality of pairs of cutters spaced apart and arranged transversely with relation to the path of movement of the sheet to be cut, a pair of feed rolls located between said cutters, the lower of said feed rolls being bodily movable toward and from the upper feed roll, a rock shaft provided with cams coöperating with said lower feed roll, a lever to rock said shaft, a holding device for said lever to maintain the lower feed roll in its operative position, and a stop for the sheet controlling said holding device.

7. In a machine of the character described, in combination, a plurality of pairs of cutters spaced apart and arranged transversely with relation to the path of movement of the sheet to be cut, a pair of feed rolls located between said cutters, the lower of said feed rolls being bodily movable toward and from the upper feed roll, a rock shaft provided with cams coöperating with said lower feed roll, a lever to rock said shaft, a holding device for said lever to maintain the lower feed roll in its operative position, a stop for the sheet controlling said holding device, and means operated by one of said cutters for elevating said lever.

8. In a machine of the character described, in combination, a plurality of pairs of cutters spaced apart and arranged transversely with relation to the path of movement of the sheet to be cut, means for feeding said sheet to said cutters, a stop to be engaged by said sheet and controlling said feeding means so as to render the sheet stationary while being cut and to feed the cut sheet out of the machine after it has been cut, means for normally holding said stop below the path of movement of said sheet, and a tripping device operable by said sheet to release said stop from its holding means, and means for projecting the stop into the path of movement of said sheet.

9. In a machine of the character described, in combination, a plurality of pairs of cutters spaced apart and arranged transversely with relation to the path of movement of the sheet to be cut, means for feeding said sheet to said cutters, a stop to be engaged by said sheet and controlling said feeding means so as to render the sheet stationary while being cut and to feed the cut sheet out of the machine after it has been cut, means for feeding said sheet to said cutters, a stop movable into and out of the path of movement of said sheet, means movable with one of said cutters for moving said stop out of the path of said sheet, means for retaining said stop out of said path, and a tripping device operated by said sheet for releasing said stop.

10. In a machine of the character described, in combination, a plurality of pairs of cutters spaced apart and arranged transversely with relation to the path of movement of the sheet to be cut, and operating simultaneously to cut the sheet transversely at the opposite ends of the latter to trim off the edges thereof, feed rolls coöperating with said sheet to positively feed the metal sheet to the said cutters when engaged therewith, and means for automatically rendering said feed rolls and said cutters alternately operable upon said sheet.

11. In a machine of the character described, in combination, a plurality of pairs of cutters spaced apart and arranged transversely with relation to the path of movement of the sheet to be cut, feed rolls for feeding said sheet to said cutters, one of which rolls is bodily movable toward and from the other, and means operated by one of said cutters for moving the movable feed roll into its operative position.

In testimony whereof I have signed my name to this specification.

CARL B. JOHNSON.